(12) United States Patent
Chang

(10) Patent No.: US 6,477,611 B1
(45) Date of Patent: Nov. 5, 2002

(54) FIELD-CONFIGURABLE, ADAPTABLE AND PROGRAMMABLE INPUT/OUTPUT BUS INTERFACE AND METHOD

(75) Inventor: Yung-Fu Chang, Medina, OH (US)

(73) Assignee: Accellent Systems Inc., Fairlawn, OH (US)

( * ) Notice: Subject to any disclaimer, the term of this patent is extended or adjusted under 35 U.S.C. 154(b) by 0 days.

(21) Appl. No.: 09/293,253

(22) Filed: Apr. 16, 1999

(51) Int. Cl.[7] .................... G06F 13/20; G06F 13/00; G06F 13/36
(52) U.S. Cl. .................... 710/313; 710/300; 710/314
(58) Field of Search .................... 710/8, 9, 10, 11, 710/14, 62, 63, 64, 65, 101–314; 713/1, 2, 100

(56) References Cited

U.S. PATENT DOCUMENTS

| | | | |
|---|---|---|---|
| 5,095,445 A | 3/1992 | Sekiguchi | 364/514 |
| 5,361,005 A | 11/1994 | Slattery et al. | 326/56 |
| 5,459,453 A | 10/1995 | Minerd et al. | 340/825 |
| 5,521,537 A | 5/1996 | Kim | 326/86 |
| 5,522,044 A | 5/1996 | Pascucci et al. | 395/200.06 |
| 5,594,874 A * | 1/1997 | Narayanan et al. | 710/104 |
| 5,623,604 A | 4/1997 | Russell et al. | 395/200.1 |
| 5,655,148 A * | 8/1997 | Richman et al. | 710/5 |
| 5,657,448 A | 8/1997 | Wadsworth et al. | 395/200.5 |
| 5,734,872 A * | 3/1998 | Kelly | 710/129 |
| 5,748,980 A | 5/1998 | Lipe et al. | 395/828 |
| 5,815,731 A * | 9/1998 | Doyle et al. | 710/10 |
| 6,012,103 A * | 1/2000 | Sartore et al. | 710/8 |
| 6,085,265 A * | 7/2000 | Kou | 710/63 |
| 6,256,691 B1 * | 7/2001 | Moroz et al. | 710/103 |
| 6,256,700 B1 * | 7/2001 | Sauber | 710/129 |

OTHER PUBLICATIONS

Structure Computer Organization by Andrew S. Tanenbaum 1990.*

* cited by examiner

Primary Examiner—Peter Wong
Assistant Examiner—Tim Vo
(74) Attorney, Agent, or Firm—Howard S. Robbins

(57) ABSTRACT

A self-configurable, adaptable and programmable (hereinafter "CAP") I/O bus (15) is provided in a digital computer (11) to establish compatibility between the input/output bus of computer (11) and an incompatible input/output bus of an external module (12). Computer (11) includes a field programmable gate array (FPGA) (31) for translating the bus configuration used by module (12) to that employed by computer (11). Two preselected CAP I/O Bus conductors (17, 18) pass an identification number from the module (12) to computer (11) that points to the location of the information necessary to compatibly configure FPGA (31). This information, which includes a bus logic FPGA image file and a device driver, and may include a protocol driver, may be found in one of several locations, including onboard computer (11) in memory, onboard module (12), or at an external site such as a server (28) accessible via the Internet. Computer (11) retrieves the configuration information from the location corresponding to the identification number, configures FPGA (31) and establishes communication between the two input/output buses.

19 Claims, 4 Drawing Sheets

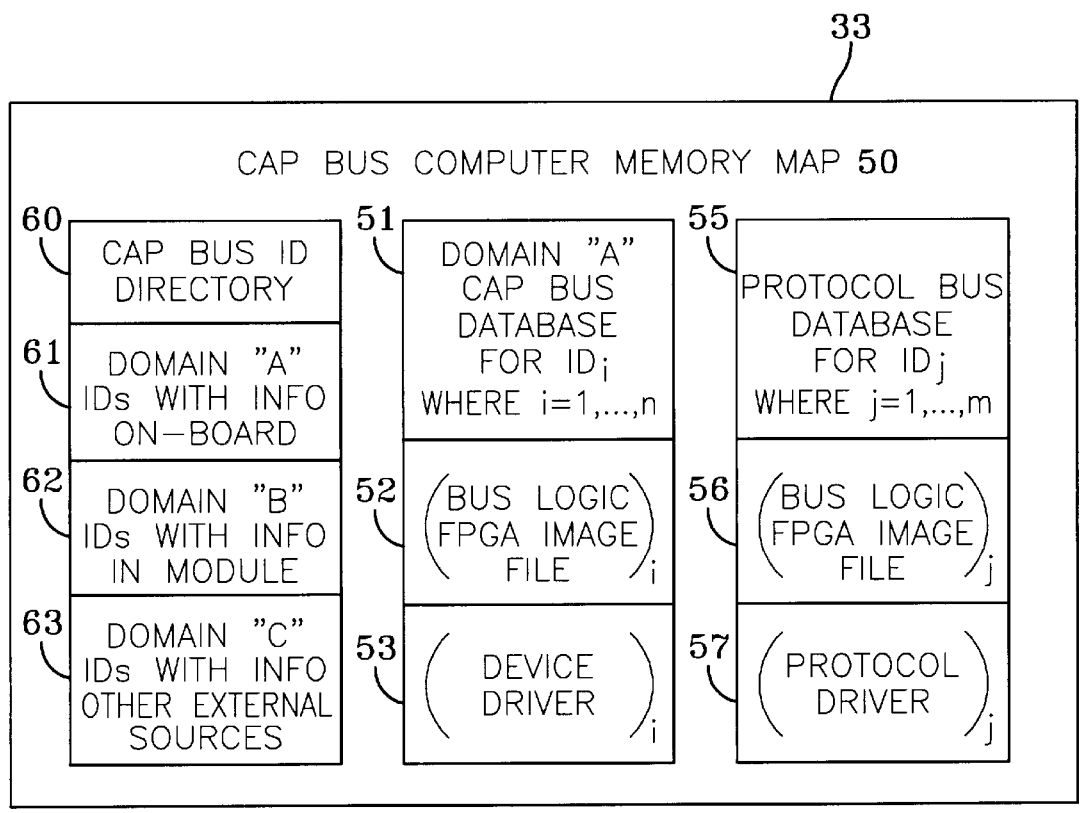
FIG-2
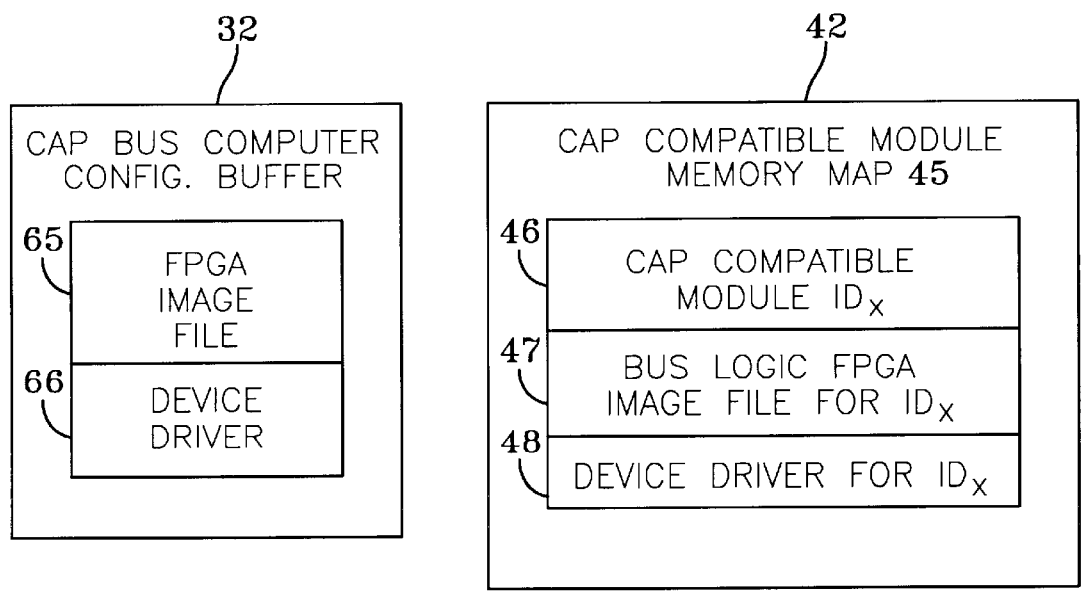
FIG-3
FIG-4

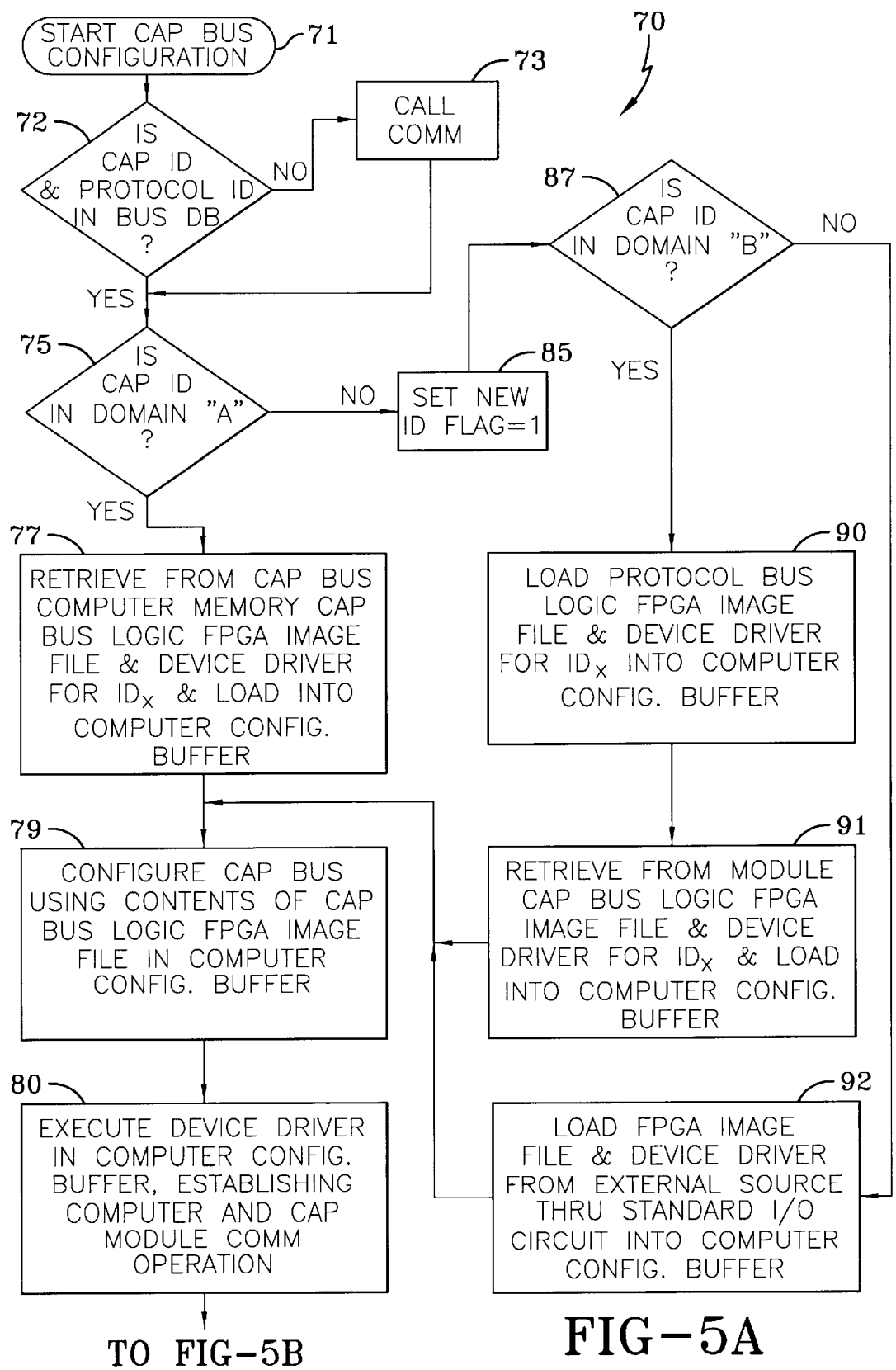

FIELD-CONFIGURABLE, ADAPTABLE AND PROGRAMMABLE INPUT/OUTPUT BUS INTERFACE AND METHOD

TECHNICAL FIELD

The present invention relates in general to buses used in electronic devices. More particularly, the present invention pertains to input/output bus systems used by electronic devices and modules. More specifically, the present invention relates to apparatus and methods used to interconnect electronic devices and modules with input/output buses having incompatible mechanical, electrical and/or logical characteristics.

BACKGROUND ART

Electronic devices such as digital computers employ a variety of internal and external buses to facilitate communication and information transfer between the various circuits or other components thereof, and other external electronic devices, which may be referred to as modules. A special class of buses, referred to as input/output (I/O) buses, have been developed to interconnect electronic devices such as digital computers with external modules. Often these buses, and, in particular, I/O buses, are configured with mechanical, electrical and/or logical characteristics optimized for the circuits and components they contain, or the application(s) they perform, and are incompatible with the buses of other electronic devices, limiting, sometimes severely, the modules with which an electronic device may be used.

This problem has been particularly vexing to computer owners and manufacturers of modules such as so-called add-in boards or peripherals that add significant functionality to a general-purpose computer. Add-in boards purchased by computer owners for one computer will not work with other computers unless the buses are the same. Manufacturers must either forgo universal compatibility, or design and inventory several versions of an add-in board to meet the needs of customers with a variety of computers having incompatible buses. Thus, for example, when a new computer having a different I/O bus is introduced, older "legacy" add-in boards and other modules cannot be moved to the new computer.

Various designs have been put forth in an attempt to minimize inoperability of electronic devices and modules having incompatible buses. Generally these designs involve predefining a limited number of bus configurations, imbuing the devices with all possible configurations, and devising some mechanism by which a common configuration may be selected. At first the compatible bus configuration was selected manually by the user, such as with the setting of a manual switch or the manual insertion or removal of jumper wires.

Another approach, employed in U.S. Pat. No. 5,655,148 to Richman et al. and marketed as "plug-n-play", involved assigning every add-in board a unique identification (ID) number, and storing it in an on-board, non-volatile memory. Every electronic device would require an on-board database of all ID numbers and the fixed bus structure associated with it. Startup of the electronic device would include checking the ID numbers for all connected add-in boards, and loading from onboard memory the resources necessary for interface. However, as many users discovered, add-in boards frequently would not interface successfully because they were not assigned an ID number, had a non-unique ID number, had an ID number not in the memory of the electronic device, or had interface physical characteristics differing from that of the electronic device.

More recently, designs for the automatic sensing and switching of bus configuration have been disclosed. One example of this technique involves the use of field programmable gate arrays (FPGAs) to allow the reconfiguration of selected bus pins. For example, in U.S. Pat. No. 5,734,872 to Kelly a system is disclosed for swapping CPUs chosen from a preselected group in and out of computers with a fixed system bus. Configuration information is stored in a read only memory. When the CPU is swapped, the signals on each pin are sampled to identify the CPU bus configuration, and the FPGA reconfigured to conform with the new CPU configuration.

Another approach is disclosed in U.S. Pat. No. 5,594,874 to Narayanan et al., where a unit for interfacing the integrated circuit package connector pins with a computer system bus can support three different, predefined bus structures using the same connector pins for different functions. A single pin on the integrated circuit, called the Address Strobe pin (ASP), is used to automatically detect a signal level representative of the bus structure to be used. As shown in FIG. 2 of the Narayanan et al. patent, if the logic level on the ADS pin is low, the other integrated circuit connector pins are configured for IBM's Industry Standard Architecture (ISA) bus configuration. If the logic level on the ADS pin is high, the other integrated circuit connector pins are configured for Intel's PI bus configuration; and if the logic level is in transition between low and high, the other integrated circuit connector pins are configured for the Video Electronics Standard Association's Local (VL) bus configuration.

Devices such as the Narayanan et al. interface unit still require that all interface characteristics be predefined and known to both the electronic device and the module with which it is desired to interconnect. These devices can only work with a very few bus configurations, the selection of which cannot be altered once chosen. The cost of the interface unit increases significantly with each additional preselected bus configuration to be made available.

SUMMARY OF THE INVENTION

It is, therefore, an object of the present invention to provide an apparatus and method for establishing compatibility between at least two incompatible I/O buses without a previously defined, common bus configuration.

It is another object of the present invention to provide an apparatus and method for establishing compatibility between at least two incompatible I/O buses, as set forth above, wherein said compatibility is established automatically without user intervention.

It is still another object of the present invention to provide an apparatus and method for establishing compatibility between at least two incompatible I/O buses, as set forth above, wherein compatibility may be established between a limitless number of incompatible I/O buses.

It is yet another object of the present invention to provide an apparatus and method for establishing compatibility between at least two incompatible I/O buses, as set forth above, wherein an I/O bus configuration selected to establish compatibility may be changed at any time to another compatible configuration.

It is a further object of the present invention to provide an apparatus and method for establishing compatibility between at least two incompatible I/O buses, as set forth above, in which cost does not increase as the number of compatible I/O bus configurations increases.

These and other objects and advantages of the present invention over existing prior art forms will become more apparent and fully understood from the following description in conjunction with the accompanying drawings.

In general, an apparats for establishing compatibility between at least two input/output buses includes a first device having a first input/output, bus with an adaptable, first configuration, and a second device having a second input/output bus incompatible with said input/output bus and with a second configuration and a memory including the location of configuration information characterizing the second configuration. The location of configuration information is communicated from the second device to the first device. The first device further includes. a processor receiving said location of configuration information from the second device, retrieving the configuration information using the location of configuration information, and reconfiguring the first input/output bus to be compatible with the second input/output bus.

A method for establishing compatibility between at least two input/output buses including a first device having a first input/output bus with an adaptable, first configuration, and a second device having a second input/output bus incompatible with said first input/output bus and with a second configuration, includes the steps of interconnecting the first device and the second device, communicating an identification number representative of the location of configuration information characterizing the second configuration from the second device to the first device, retrieving the configuration information from the location corresponding to the identification number, reconfiguring the first input/output bus compatible with the second input/output bus, and, establishing communication between the first input/output bus and the second input/output bus.

A method for establishing compatibility between at least two input/output buses including a first device having a first input/output bus with an adaptable, first configuration, the first device including a field programmable gate array, and a second device having a second input/output bus with a second configuration, the second configuration information including a field programmable gate array image file, and at least one of a device driver and a protocol driver, includes selecting an identification number representative of the location of configuration information characterizing the second configuration, and storing the identification number in the second device. The field programmable gate array image file, and any device driver and protocol driver corresponding to the configuration of the second device are stored in said second device. The first device and the second device are interconnected. The identification number representative of the location of configuration information characterizing the second configuration is communicated from the second device to the first device. The configuration information is retrieved from the location corresponding to the identification number from one of a plurality of locations including the first device, the second device and an external source. The field programmable gate array image file, and any device driver and protocol driver are communicated from the second device to the first device. The first input/output bus is reconfigured compatible with the second input/output bus. Communication is established between the first input/output bus and the second input/output bus.

BRIEF DESCRIPTION OF THE DRAWINGS

FIG. 2 is a block diagram of an exemplary CAP Bus computer memory map.

FIG. 3 is a block diagram of an exemplary CAP Bus computer configuration buffer.

FIG. 4 is a block diagram of an exemplary CAP compatible module memory map.

FIGS. 5A and 5B together present a top-level flow chart of an exemplary method for configuration of the CAP Bus computer and CAP compatible module shown in FIG. 1.

PREFERRED EMBODIMENT FOR CARRYING OUT THE INVENTION

Figure 1:
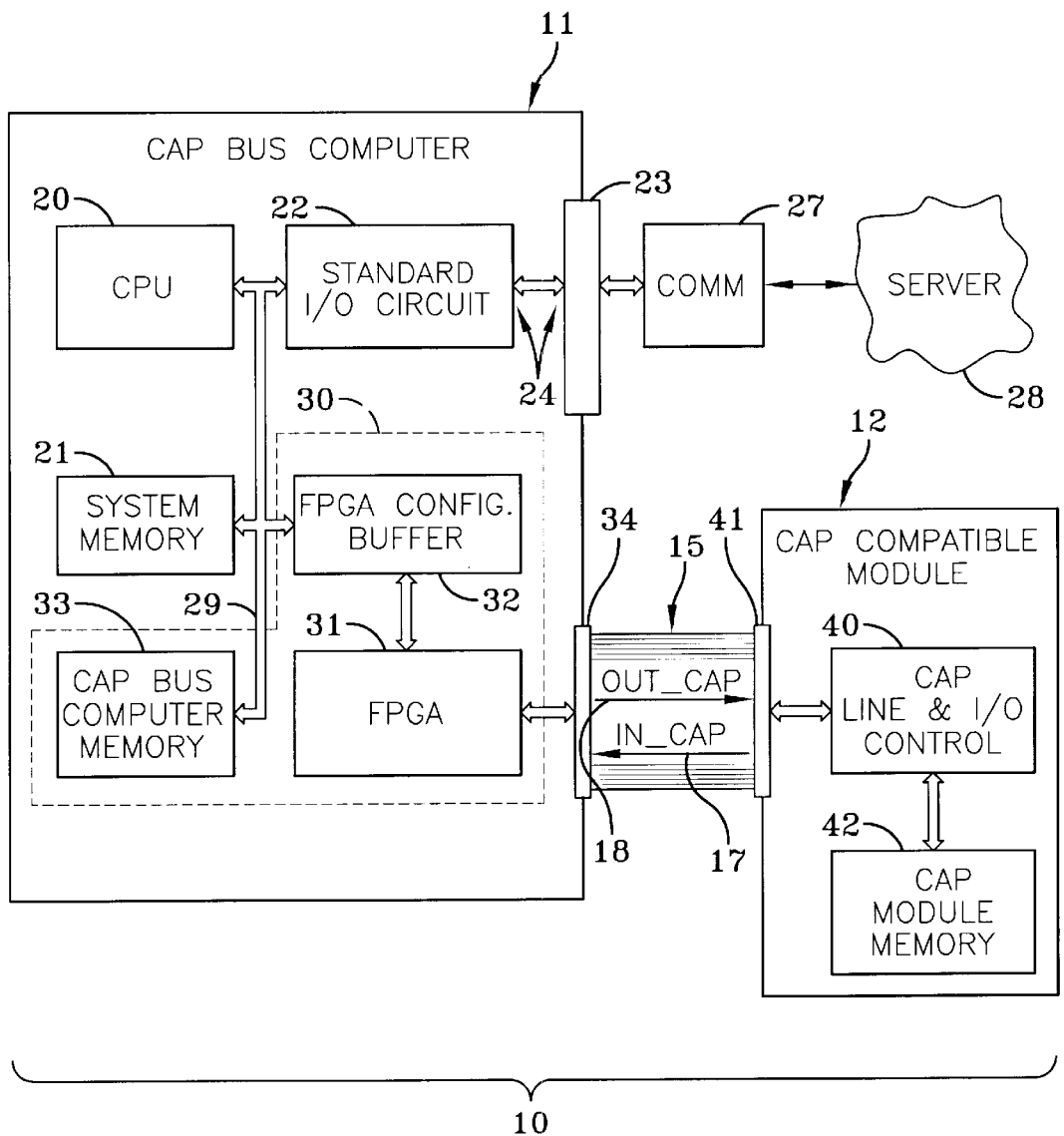
FIG. 1 is a block diagram of an exemplary electronic device, such as a digital computer, and an external module having a self-configurable, adaptable and programmable (hereinafter "CAP") I/O bus in accordance with the present invention.

FIG. 1 is a block diagram of an exemplary system 10 including an exemplary electronic device, such as a digital computer 11, and an external module 12 having a self-configurable, adaptable and programmable (hereinafter "CAP") I/O bus 15 in accordance with the present invention. The present invention allows computer 11 to interface with a module 12 irrespective of whether its I/O bus configuration is known to computer 11. This is accomplished in part by designating an open architecture scheme, which may be referred to as the CAP I/O Bus specification, and constructing an I/O circuit in both computer 11 and module 12 in accordance with that specification, whereby information representative of the I/O bus configuration of module 12 may be communicated without user intervention to computer 11.

The CAP I/O Bus specification contemplates that computer 11 will include a configurable device such as a FPGA for translating, where necessary, the bus configuration used by the external device to that employed by computer 11. The CAP I/O Bus specification further contemplates that at least one, and preferably two conductors of CAP I/O Bus 15 will be at least preliminarily employed to pass an identification number from module 12 to computer 11 that, in accordance with the specification, instructs computer 11 where it can find the information necessary to compatibly configure the FPGA. This information, which includes a bus logic FPGA image file and a device driver, and may include a protocol driver, may be found in one of several locations, including onboard computer 11 in memory, onboard module 12, or at an external site such as a server accessible via the Internet.

Computer 11 broadly includes a processor such as central processing unit (hereinafter "CPU") 20, conventional system memory 21 such as volatile read addressable memory, and a conventional I/O circuit 22 such as an RS-232c compatible serial communication circuit connected through a standard "D" shell DB-9 or DB-25 connector 23, thereby forming a standard protocol port 24. Any conventional communication device compatible with standard protocol port 24, such as an analog modem 27, may be electrically connected with connector 23 to allow communication with external computers and networks such as a server 28 accessible through the Internet. CPU 20, system memory 21, and I/O circuit 22 are electrically interconnected using any desired internal system bus 29, whether open-architecture or proprietary.

Computer 11, which also may be referred to as CAP I/O Bus computer 11, also includes a CAP interface circuit 30 having a FPGA 31, a FPGA configuration buffer 32, and a CAP Bus memory 33. FPGA configuration buffer 32, CAP Bus memory 33, and, where desired, FPGA 31, are electrically interconnected using internal system bus 29. FPGA 31 is electrically connected to CAP I/O bus 15 through a connector 34 or other interface described further hereinafter.

FPGA 31 may be any field programmable gate array whose performance is compatible with CAP Bus computer 11 and CAP interface circuit 30, and whose logic cell capacity is sufficient to configure CAP interface circuit 30, such as one of the Spartan and Spartan-XL Families of FPGAs made by XILINX, Inc. of San Jose, Calif. Suitable FPGAs also may be obtained from other manufacturers including Altera Corporation of San Jose, Calif., and Lucent Technologies, Inc. of Murry Hill, N.J. FPGAs that are reconfigurable via Internet and other distant communication vehicles will allow an additional advantageous dimension to the present invention further explained hereinbelow; consequently, FPGAs which include such reconfiguration abilities, such as the Virtex series FPGA from XILINX, may be preferred in some applications.

CAP compatible module 12 includes a CAP line and I/O control circuit 40, which is electrically connected to CAP I/O bus 15 through a connector 41 or other interface described further hereinafter, and CAP module memory 42. CAP line and I/O control circuit 40 may be any of the various line control circuits well known to the ordinarily skilled artisan for interfacing the internal bus architecture of module 12 with the I/O bus configuration chosen by the designer of module 12. Cap module memory 42 may be any memory capable of the nonvolatile storage of the CAP I/O Bus specification identification number appropriate for that external module 12.

As noted hereinbefore, at least one conductor of CAP I/O Bus 15, which may be called IN_CAP conductor (or line or pin) 17, is used to communicate the identification number for module 12 from module 12 to computer 11 using any single conductor simplex or duplex signalling techniques well known to the ordinary skilled artisan. While IN_CAP conductor 17 also may be used for signalling in the other direction, that is from computer 11 to module 12, it is preferable to employ a second conductor, which may be called OUT_CAP conductor (or line or pin) for that purpose, again as is well known.

FIG. 2 presents a block diagram of an exemplary memory map 50 for CAP Bus memory 33. Understanding the permissible and preferable content and structure of CAP Bus memory 33 is facilitated by first understanding the basic arrangement of the CAP I/O Bus specification, that is, what information is needed and where that information can be found.

Complete configuration of an I/O bus requires knowledge of the physical characteristics of the bus (e.g., the physical cable and plug layout), the electromagnetic properties of the communication signals (e.g., what conductor voltages are used for the various available logic levels), and the logical properties of the communication (also known as the protocol or communication software). Unless a physical connection can be made between computer 11 and module 12, no interconnection is possible. Thus, only the electromagnetic and logical properties of a given I/O bus need be furnished to computer 11. More particularly, in the instance where, as here, a FPGA provides I/O bus translation, the ordinarily skilled artisan would recognize that a complete I/O bus configuration could be conveyed with a bus logic FPGA image file to configure FPGA 31, and either a device driver or a protocol driver, depending on the nature of module 12.

For purposes of the embodiment of the invention described herein, it shall be assumed that the configuration information necessary to configure FPGA 31 to interface correctly with module 12 is available in one of four locations: onboard computer 11 in CAP Bus memory 33 (which shall be referred to as Domain "A"); onboard module 12 in CAP module memory 42 (which shall be referred to as Domain "B"); from another external source such as a server via the Internet (which shall be referred to as Domain "C"); and another location reserved for future use (which shall be referred to as Domain "D"). Thus, two binary bits may be used to point to the correct domain from which computer 11 could find the configuration information necessary to configure FPGA 31 to interface correctly with module 12, and the public CAP I/O Bus specification may designate the two most significant bits of each word for this function.

The public CAP I/O Bus specification designates the specific, onboard memory address to be employed by CAP compliant devices such as computer 11 at which is to be found known bus logic FPGA image files, device drivers and protocol drivers. The CAP I/O Bus specification may provide, for example, that all CAP I/O Bus compliant devices include the bus logic FPGA image file and device driver for the twenty most popular I/O bus configurations.

In the present example CAP Bus computer memory 33 includes three databases, as seen in the CAP Bus computer memory map 50 shown in FIG. 2. A first database, referred to as Domain "A" CAP Bus Database 51, has i entries each having a bus logic FPGA image file 52 and a device driver 53. A second database, referred to as Protocol Bus Database 55, has j entries each having a bus logic FPGA image file 56 and a protocol driver 57.

A third database, CAP Bus ID Directory 60, includes three memory ranges 61, 62 and 63 which associate a secondary memory pointer with each identification number. Memory range 61 includes secondary memory pointers for CAP Bus configurations whose bus logic FPGA image files 52 and 56, device driver 53, and/or protocol driver 57 are stored onboard CAP Bus computer memory 33 in either the Domain "A" CAP Bus Database 51 or the Protocol Bus Database 55. Memory range 62 includes secondary memory pointers for CAP Bus configurations whose bus logic FPGA image files 52 and 56, device driver 53, and/or protocol driver 57 may be found in the CAP module memory 42 of module 12. Memory range 63 includes secondary memory pointers for CAP Bus configurations whose bus logic FPGA image files 52 and 56, device driver 53, and/or protocol driver 57 may be found in external sources such as on a server accessible over the Internet.

As well known to the skilled artisan, the current configuration of FPGA 31 may be set by the content of FPGA configuration buffer 32, which includes the current FPGA image file 65 and current device driver 66, as depicted in FIG. 3.

FIG. 4 presents an exemplary memory map 45 for CAP module memory 42, which includes the identification number 46 for $ID_x$, the bus logic FPGA image file 47 for $ID_x$, and the device driver 48 for $ID_x$.

In accordance with the present invention, $ID_x$ is chosen by the designer of CAP compatible module 12 to reveal the location of the configuration information for the selected I/O Bus configuration. Thus, when module 12 is designed and an I/O Bus configuration chosen, the designer of CAP compatible module 12 refers to the public CAP I/O Bus specification to find the entry in CAP Bus ID directory 60 whose secondary memory pointer corresponds to the bus logic FPGA image files, device driver, and/or protocol driver needed for module 12.

For example, assume module 12 employs a Peripheral Component Interface (hereinafter called "PCI") Bus architecture and the Windows 98 Operating System, and that this is a sufficiently popular combination that its configuration information is stored within CAP Bus computer memory 33. Reference to the CAP I/O Bus specification reveals that the CAP Bus identification number, say 5, whose corresponding secondary memory pointer is directed to the required bus logic FPGA image files 52 and device driver 53 in Domain "A" CAP Bus Database 51 for the PCI/Windows 98 combination. In this instance the identification number 5 would be stored as ID, in CAP compatible module 46. In the event module 12 was to be interconnected with a electronic device 11 that did not include the corresponding bus logic FPGA image file and device driver, they could be respectively stored in module 12 in bus logic FPGA image file 47 and device driver 48.

Figure 5B:
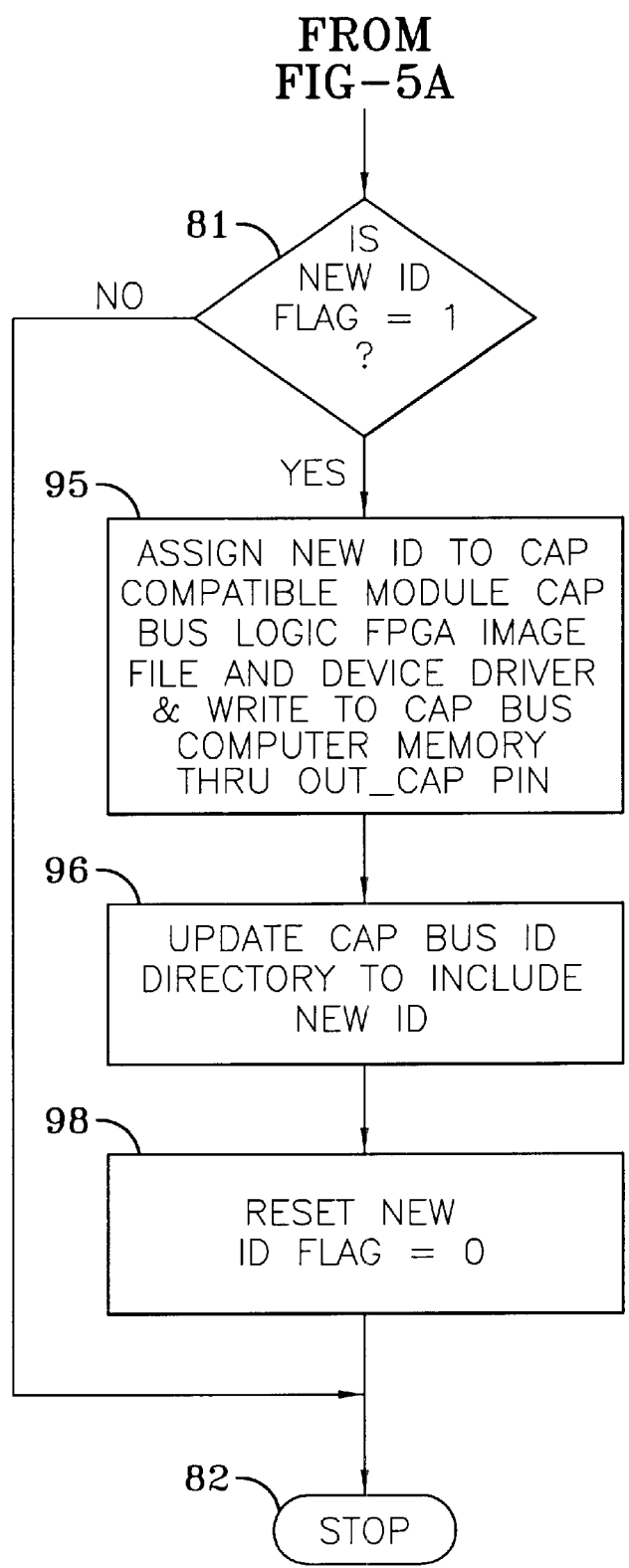

The flow chart shown in FIGS. 5A and 5B presents an exemplary method for the configuration of the CAP I/O Bus 15 so as to be compatible with both computer 11 and CAP compatible module 12. Prior to execution of this exemplary configuration method an identification of the location of configuration information characterizing the configuration of the external module 12 CAP I/O Bus is stored in some memory of module 12, and the I/O buses of computer 11 and module 12 are interconnected. In broad terms, the method involves communicating the identification information to computer 11, retrieving that information from the location specified by the identification, reconfiguring the I/O Bus of computer 11 to be compatible with the I/O Bus configuration of external module 12, and establishing communication between the I/O buses of computer 11 and module 12.

This configuration method, identified generally with the numeral 70, is begun at block 71, and proceeds first with a test in block 72 of whether or not the identification number and protocol for module 12 has been yet communicated to computer 11. If not, the conventional signalling technique specified by the CAP Bus Specification noted hereinbefore is called in block 73 and utilized to transmit the identification number and protocol from module 12 to computer 11 via IN_CAP conductor 17.

Next the two most significant bits of the identification number are examined by CPU 20 in block 75 to determine if the configuration information is located in Domain "A". If so, in block 77 the corresponding CAP Bus logic FPGA image file, and device driver for $ID_x$ are retrieved from CAP Bus computer memory 33 and loaded into FPGA configuration buffer 32. FPGA 31 then configures the CAP Bus in accordance with the contents of FPGA configuration buffer 32, as described in block 79, and, in block 80, the device driver is executed, thereby establishing communication operation between computer 11 and module 12. In block 81 a test, further described below, is made to determine if the identification number in module 12 is not already known to computer 11, and the configuration process stopped in block 82 when the identification number for module 12 is already stored in CAP Bus ID directory 60.

If the configuration information for module 12 is not located in Domain "A" (block 75), a new ID flag is set to a logic level 1 (block 85), and the two most significant bits of the identification number are examined by CPU 20 in block 87 to determine if the configuration information is located in Domain "B", module 12. If so, in block 90 the corresponding protocol bus logic FPGA image file, and protocol driver for $ID_x$ are retrieved from CAP Bus computer memory 33 and loaded into FPGA configuration buffer 32, thereby configuring CAP I/O Bus 15 with a common protocol and protocol driver for computer 11 and module 12. Thereafter, in block 91, the CAP Bus logic FPGA image file and device driver for $ID_x$ are retrieved from CAP module memory 42 and transferred to and loaded into FPGA configuration buffer 32. The remaining process for configuring CAP I/O Bus is the same as when the configuration information was obtained from Domain "A".

If the configuration information for module 12 is not located in Domain "A" or Domain "B" as determined in block 87, then in the present example the configuration information must be located at some external source such as a server accessible over the Internet. CPU 20 may then utilize conventional I/O circuit 22 and modem 27 or other conventional communication device to retrieve the CAP Bus logic FPGA image file and device driver for $ID_x$ from the location corresponding with the identification number for module 12 and load them into FPGA configuration buffer 32 (block 92).

If no identification number is employed by module 12 or the employed identification number is not in CAP Bus ID directory 60, it may be added thereto to facilitate establishing I/O bus compatibility in the future. One way this may be accomplished is with the use of new ID flag, which noted hereinbefore may be set to a high logic level whenever a corresponding identification number is not in Domain "A" (block 75). Whenever in block 81 new ID flag is found set to a high logic level, a new number is assigned in block 95 to identify the location of the CAP Bus logic FPGA image file and device driver for module 12, and that new identification number written to CAP module memory 42 through OUT_CAP conductor 18 (block 95). CAP Bus computer memory 33 is likewise updated in block 96 to include the new identification number, and the new ID flag reset to zero in block 98.

One of ordinary skill should now appreciate that the present invention will operate successfully with any interface (also called "interconnection") between computer 11 and module 12 so long as there exists at least a common signal path by which to communicate the CAP identification number. So, for example, a suitable physical interconnection could be wired with any number of conductors, or it could be wireless.

Inasmuch as the present invention is subject to variations, modifications and changes in detail, some of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the art of establishing compatibility between at least two input/output buses.

What is claimed is:

1. Apparatus for establishing compatibility between at least two input/output buses, comprising:

a first device having a first input/output bus with an adaptable, first configuration;

a second device having a second input/output bus incompatible with said first input/output bus and with a second configuration and a memory including the location of configuration information characterizing said second configuration, said second device communicating said location of configuration information to said first device; and, said first device further including a processor receiving said location of configuration information from said second device, retrieving said configuration information from said location of configuration information, and reconfiguring said first input/output bus compatable with said second input/output bus.

2. Apparatus, as set forth in claim 1, wherein said first input/output bus and said second input/output bus each include a plurality of lines for carrying electrical signals, and a first line is preselected for communication of said location of configuration information between said first device and said second device.

3. Apparatus, as set forth in claim 1, wherein said first device further includes an internal system bus and an input/output bus interface circuit including a field programmable gate array electrically connected with said first input/output bus and said internal system bus.

4. Apparatus, as set forth in claim 1, wherein said first device further includes a circuit for communication with, and retrieval of input/output bus configuration information from, at least one external source.

5. Apparatus, as set forth in claim 1, wherein said first device is a computer.

6. Apparatus, as set forth in claim 1, wherein said device includes a field programmable gate array.

7. Apparatus, as set forth in claim 2, wherein said first line is preselected for communication from said first device to said second device, and a second said line is preselected for communication from said second device to said first device.

8. Apparatus, as set forth in claim 3, wherein said input/output bus interface circuit includes a memory electrically connected to said internal system bus, said memory including configuration information for a plurality of input/output buses stored therein.

9. Apparatus, as set forth in claim 4, wherein said external source is at least one of a public network, a private network, and an individual computer.

10. Apparatus, as set forth in claim 9, wherein said external source is a server accessible via the Internet.

11. A method for establishing compatibility between at least two input/output buses including a first device having a first input/output bus with an adaptable, first configuration, and a second device having a second input/output bus incompatible with said first input/output bus and with a second configuration, comprising the steps of:

interconnecting said first device and said second device;

communicating an identification number representative of the location of configuration information characterizing the second configuration from said second device to said first device;

retrieving said configuration information from the location corresponding to said identification number;

reconfiguring said first input/output bus compatible with said second input/output bus; and, establishing communication between said first input/output bus and said second input/output bus.

12. A method for establishing compatibility between at least two input/output buses, as set forth in claim 11, further including the steps of selecting an identification number representative of the location of configuration information characterizing the second configuration, and, storing said identification number in said second device.

13. A method for establishing compatibility between at least two input/output buses, as set forth in claim 12, wherein said first input/output bus and said second input/output bus each includes a plurality of lines for carrying electrical signals, and wherein said step of communicating an identification number includes the step of selecting a first line for communication of said location of configuration information from said second device to said first device.

14. A method for establishing compatibility between at least two input/output buses, as set forth in claim 12, wherein said step of retrieving said configuration information retrieving said configuration from one of a plurality of locations including said first device, said second device and an external source.

15. A method for establishing compatibility between at least two input/output buses, as set forth in claim 13, wherein said step of communicating an identification number includes the further step of selecting a second line for communication between said first device and said second device.

16. A method for establishing compatibility between at least two input/output buses, as set forth in claim 14, wherein said first device includes a field programmable gate array and said configuration information includes a field programmable gate array image file, and at least one of a device driver and a protocol driver, further including the steps of storing field programmable gate array image files, device drivers and protocol drivers for a plurality of input/output bus configurations in said first device, storing in said first device a plurality of preselected identification numbers corresponding to a plurality of input/output bus configurations, and said step of retrieving said configuration information retrieving said field programmable gate array image files, device drivers and protocol drivers for said second device from said first device.

17. A method for establishing compatibility between at least two input/output buses, as set forth in claim 14, wherein said first device includes a field programmable gate array and said configuration information includes a field programmable gate array image file, and at least one of a device driver and a protocol driver, said step of retrieving said configuration information retrieving said field programmable gate array image files, device drivers and protocol drivers for said second device from at least one of a public network, a private network, an individual computer and a server accessible via the Internet.

18. A method for establishing compatibility between at least two input/output buses including a first device having a input/output bus with an adaptable, first configuration, said first device including a field programmable gate array, and a second device having a second input/output bus with a second configuration, second configuration information characterizing said second configuration including a field programmable gate array image file, and at least one of a device driver and a protocol driver, comprising the steps of:

selecting an identification number representative of the location of said configuration information characterizing said second configuration, and storing said identification number in said second device;

storing said field programmable gate array image file, and any said device driver and said protocol driver corresponding to said configuration of said second device in said second device;

interconnecting said first device and said second device;

communicating said identification number representative of the location of configuration information characterizing said second configuration from said second device to said first device;

retrieving said configuration information from the location corresponding to said identification number from one of a plurality of locations including said first device, said second device and an external source;

communicating said field programmable gate array image file, and any said device driver and said protocol driver from said second device to said first device;

reconfiguring said first input/output bus compatible with said second input/output bus; and, establishing communication between said first input/output bus and said second input/output bus.

19. A method for establishing compatibility between at least two input/output buses, as set forth in claim 18, further including the step of storing said field programmable gate array image file, and any said device driver and said protocol driver received from said second device in said first device with its corresponding identification number.

* * * * *